US009498705B2

(12) United States Patent
May et al.

(10) Patent No.: US 9,498,705 B2
(45) Date of Patent: Nov. 22, 2016

(54) VIDEO GAME SYSTEM HAVING NOVEL INPUT DEVICES

(71) Applicant: Activision Publishing, Inc., Santa Monica, CA (US)

(72) Inventors: Timothy May, Eden Prairie, MN (US); George Batog, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 342 days.

(21) Appl. No.: 13/717,471

(22) Filed: Dec. 17, 2012

(65) Prior Publication Data

US 2014/0171201 A1   Jun. 19, 2014

(51) Int. Cl.

| A63F 13/06 | (2006.01) |
|---|---|
| A63F 13/20 | (2014.01) |
| A63F 13/211 | (2014.01) |
| A63F 13/24 | (2014.01) |
| A63F 13/837 | (2014.01) |
| A63F 13/42 | (2014.01) |
| A63F 13/212 | (2014.01) |

(52) U.S. Cl.
CPC .............. *A63F 13/06* (2013.01); *A63F 13/211* (2014.09); *A63F 13/212* (2014.09); *A63F 13/24* (2014.09); *A63F 13/42* (2014.09); *A63F 13/837* (2014.09); *A63F 2300/6027* (2013.01)

(58) Field of Classification Search
CPC ......... A63F 13/06; A63F 13/10; A63F 13/12
USPC .............................................. 463/35, 36, 43
See application file for complete search history.

(56) References Cited

U.S. PATENT DOCUMENTS

| 4,683,891 A * | 8/1987 | Cornellier ............ A61B 5/0533 128/905 |
|---|---|---|
| 5,001,632 A | 3/1991 | Hall-Tipping |
| 5,772,508 A * | 6/1998 | Sugita et al. .................. 463/36 |
| 6,450,820 B1 | 9/2002 | Palsson et al. |
| 7,654,901 B2 | 2/2010 | Breving |
| 8,140,143 B2 | 3/2012 | Picard et al. |
| 2007/0117628 A1 | 5/2007 | Stanley |
| 2007/0207858 A1* | 9/2007 | Breving .................. A63F 13/06 463/36 |
| 2008/0098448 A1* | 4/2008 | Mondesir ......... H04N 21/42201 725/126 |
| 2011/0009193 A1 | 1/2011 | Bond et al. |
| 2011/0184248 A1* | 7/2011 | Furuta et al. ................. 600/300 |
| 2012/0004034 A1 | 1/2012 | Pope et al. |

(Continued)

OTHER PUBLICATIONS

"Cabela's Dangerous Hunts 2013 Review: Masking Fear" written by Matt Leoneon, published on Nov. 12, 2012, printed and accessible from URL <http://www.polygon.com/2012/11/12/3624018/cabelas-dangerous-hunts-2013-review>, 7 pages.*

(Continued)

*Primary Examiner* — Jason Skaarup
(74) *Attorney, Agent, or Firm* — Klein, O'Neill & Singh, LLP

(57) ABSTRACT

A video game system includes an input device, where the input device has at least one physiological sensing device for determining at least one physiological state of a user. The input device further has at least one motion sensing device for determining the motion and/or position of the input device and/or the user. The video game system further comprises a processor for using the physiological state and the motion and/or position of the input device and/or user to control game play.

28 Claims, 11 Drawing Sheets

(56) References Cited

U.S. PATENT DOCUMENTS

2012/0075463 A1* 3/2012 Chen et al. ................. 348/135
2013/0288805 A1* 10/2013 Osawa et al. ................ 463/43

OTHER PUBLICATIONS

"Lions, Tigers, and Deer—Oh My!: Hunting Expeditions & Dangerous Hunts 2013 Hands-On Impressions," written by Matt Randisi, published on or before Sep. 26, 2012, printed and accessible from URL <http://www.gamesabyss.com/lions-tigers-and-deer-oh-my-hunting-expeditions-dangerous-hunts-2013-hands-on-impressions/>, 6 pages.*
"Cabela's Dangerous Hunts 2013" written by Mike Splechta, published on Nov. 6, 2012, printed and accessible from URL <http://webcache.googleusercontent.com/search?q=cache:7oFpyx7ISRkJ:www.gamezone.com/reviews/review-cabela-s-dangerous-hunts-2013-features-an-impressive-peripheral-and-intense-survival+&cd=1&hl=en&ct=clnk&gl=us>, 7 pages.*
"Cabela's Dangerous Hunts 2013 Review—A Danger to Itself and Others," written by Shelby Reiches, published on or before Nov. 17, 2012, printed and accessible from URL <http://www.cheatcc.com/xbox360/rev/cabelasdangeroushunts2013review.html>, 4 pages.*
Game Manual for Cabela's Dangerous Hunts 2013, published by Activision Publishing on or before Oct. 23, 2012, 8 pages.*
Video entitled "Quick Look: Cabela's Dangerous Hunts 2013," posted by Vinny Caravella on Oct. 25, 2012, printed and accessed at URL <http://www.giantbomb.com/videos/quick-look-cabelas-dangerous-hunts-2013/2300-6726/> 1 page.*
"Behold the Fearmaster: Activision's Gaming Gun With a Twist" written by Pete Pachal, published on or before Aug. 8, 2012, printed and accessed at URL <http://mashable.com/2012/08/08/activision-fearmaster/>, 17 pages.*

* cited by examiner

VIDEO GAME SYSTEM HAVING NOVEL INPUT DEVICES

BACKGROUND OF THE INVENTION

The present invention relates generally to video game systems and, more particularly, to video game systems having input controllers with physiological sensing devices, motion sensing devices, and feedback devices.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video game systems have traditionally utilized a variety of input devices to allow a user to interact with the game, including, for example, joysticks, gamepads, keyboards, mice, trackballs, touch screens, or other known input devices. Traditional input devices generally do not accurately represent the activity being carried out in the video game. For example, with respect to a hunting simulation video game, a traditional gamepad input device fails to accurately represent the use of an actual hunting rifle. Similarly, with respect to a tennis simulation video game, a keyboard and mouse are poor representations of a real tennis racquet. Traditional input devices thus often fail to deliver a game play experience that adequately captures the simulated activity.

Recently, video game systems have utilized motion sensing devices that determine the movement and/or position of the input device and/or the user to allow a user to physically interact with the game. These motion sensing devices are included in, for example, the Nintendo Wii and Wii U platforms, the Microsoft Kinect platform, and the PlayStation Move platform. Video game systems with motion sensing devices allow the user to physically interact with the video game and better mimic the activity being carried out in the video game. For example, in a hunting simulation video game using a motion sensing device, the user may physically "aim" the input controller to simulate the aiming of a virtual hunting rifle. Likewise, in a tennis simulation video game using a motion sensing device, the user may physically mimic a tennis swing to command a virtual character to swing a tennis racquet.

As compared to traditional input devices, motion sensing devices may provide a more lifelike and realistic game play experience. Nevertheless, current input devices are still lacking in realism and fail to provide fully immersive experiences for the user. Moreover, current video game systems do not adequately utilize a variety of additional inputs from the user, such as the user's physiological state. This invention seeks to address these and other problems in the art.

BRIEF SUMMARY OF THE INVENTION

One aspect of the invention provides a video game system comprising an input device, where the input device has at least one physiological sensing device for determining at least one physiological state of a user. The input device further has at least one motion sensing device for determining the motion and/or position of the input device and/or the user. The video game system further comprises a processor for using the physiological state and the motion and/or position of the input device and/or user to control game play.

In another aspect of the invention, the physiological state indicates, for example, one or more of the following: heart rate, respiratory sinus arrhythmia, skin electrical activity, muscle action potential, blood pressure, skin temperature, respiratory rate, or any other physiological measurement. According to this aspect of the invention, the physiological state may be used to dynamically control game play by, for example, altering or manipulating the game's difficulty level, background music, overall volume level, visual effects, story line, activities or behaviors of game controlled game characters, or other aspects of game play.

In another aspect of the invention, the motion and/or position of the input device and/or user is used to control the activity being carried out in the video game. Further, the motion and/or position of the input device or/or user may be used to dynamically control game play by, for example, altering or manipulating the game's difficulty level, background music, overall volume level, visual effects, story line, activities or behaviors of game controlled game characters, or other aspects of game play.

In another aspect of the invention, the input device is physically formed to represent an object being used in an activity carried out in the video game. For example, in a hunting simulation video game, the input device may be physically formed as a hunting rifle or gun. Other examples include physically forming the input device as a weapon, steering wheel, piece of sporting equipment, or other in-game object. According to this aspect of the invention, the user operates the input device in a manner that mimics the actual operation of in-game object. Another aspect of the invention provides a video game system comprising an input device, where the input device has at least one feedback device for providing haptic, visual, or audio feedback from the video game console to the user.

Another aspect of the invention provides a video game system, comprising: an input device; and a video game console with a processor, said processor being configured to: receive data indicating a physiological state of a user; process said physiological state data; and provide game play, based on inputs from the input device, in context of said physiological state data. In some aspects of the invention said processor being configured to provide game play in context of said physiological state data comprises said processor being configured to modify effects of inputs from the input device based on said physiological state data. In some aspects of the invention said processor being configured to provide game play in context of said physiological state data comprises said processor being configured to disallow entry into game play modes based on said physiological state data. In some aspects of the invention said processor being configured to provide game play in context of said physiological state data comprises said processor being configured to provide a game adjunct presentation based on said physiological state data.

Another aspect of the invention provides computer readable non-transitory medium storing program instructions for execution by a processor, the program instructions including program instructions for: receiving physiological state data for a user of a video game; comparing the physiological state data to at least one reference value; and providing for video game play in context of a result of the comparison. In some aspects of the invention the program instructions providing for video game play in context of a result of the comparison comprise program instructions for responding to a request to enter a game mode based on the result of the comparison. In some aspects of the invention the program instructions providing for video game play in context of a result of the comparison comprise program instructions for selecting background music to video game play based on the result of the comparison.

Another aspect of the invention provides a method performed by at least one processor executing program instructions, the method comprising: receiving physiological state data for a user of a video game; comparing the physiological state data to at least one reference value; and providing for video game play in context of a result of the comparison. In some aspects of the invention providing for video game play in context of a result of the comparison comprises responding to a request to enter a game mode based on the result of the comparison. In some aspects of the invention providing for video game play in context of a result of the comparison comprises selecting background music to video game play based on the result of the comparison. In some aspects of the invention providing for video game play in context of a result of the comparison comprises altering a frequency of attacks by game controlled characters based on the result of the comparison. In some aspects of the invention providing for video game play in context of a result of the comparison comprises modifying effects of user commands for a user controlled game character indicated by inputs from a user input device based on a result of the comparison.

These and other aspects of the invention are more fully comprehended upon review of this disclosure.

DETAILED DESCRIPTION

Figure 1:
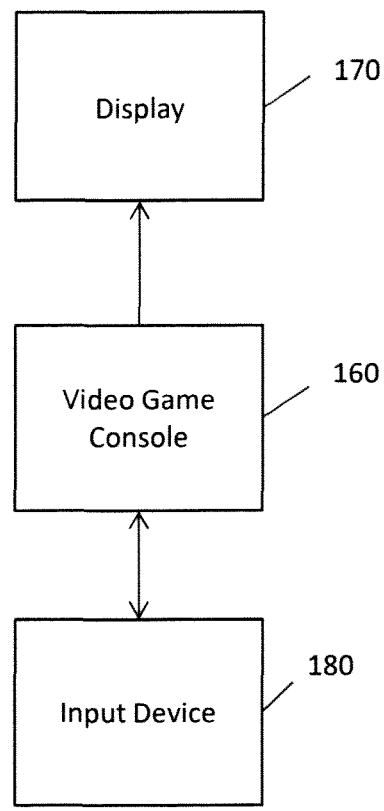
FIG. 1 is a block diagram illustrating an example of a video game system in accordance with aspects of the present invention.

FIG. 1 is a block diagram illustrating an example of a video game system in accordance with aspects of the present invention. Referring to FIG. 1, the video game system includes a video game console 160 with a processor for executing program instructions providing for game play and associated circuitry, a display device 170, and an input device 180. In providing game play, the processor, responsive to inputs from the input device, generally commands display on the display device of game characters in and interacting with a virtual world of game play and possibly each other, with generally at least one of the game characters controlled by a user operating the input device. In various embodiments the video game console 160 may instead comprise another computing device, including, for example, a computer, a mobile device, a tablet, a portable gaming device, a remote server, or any other gaming platform alone or in combination with other devices in a system. Further, although FIG. 1 depicts a display 170 and input device 180 as separate components from the video game console 160, it is understood that in various embodiments one or more of these components may be integrated into a single device or combination of devices, and/or may themselves comprise multiple devices.

In some embodiments the input device includes at least one physiological sensor. The physiological sensor senses at least one physiological state of a user of the input device, with the physiological state being, for example and in various embodiments, a heart rate, a skin temperature, skin electrical activation, blood pressure, respiratory rate, or some other physiological state. Information from the physiological sensor is received by the video game console, which utilizes the information to provide game play in context of the user's physiological state.

In some embodiments providing game play in context of the user's physiological state comprises adjusting activities of game controlled game characters to act in accordance with or responsive to the user's physiological state, or to disallow certain user controlled game character actions or activities based on the user's physiological state, or to modify or vary user provided control inputs based on the user's physiological state. For example, in some embodiments a game controlled opposing character may behave more aggressively if the user's physiological state indicates that the user is in fear, or a game mode to implement fine and detailed game character actions may be made unavailable if the user's physiological state indicates that the user is overly excited, or game controller inputs may be effectively amplified, delayed, or oscillated if the user's physiological state indicates that the user is nervous. In some embodiments providing game play in context of the user's physiological state comprises providing non-game play user presentations based on the user's physiological state. For example, in some embodiments selection or volume of background music presented to the user, but which may not be expected to be present in the game world (e.g. audible to game characters), may be varied based on the user's physiological state.

Figure 2:
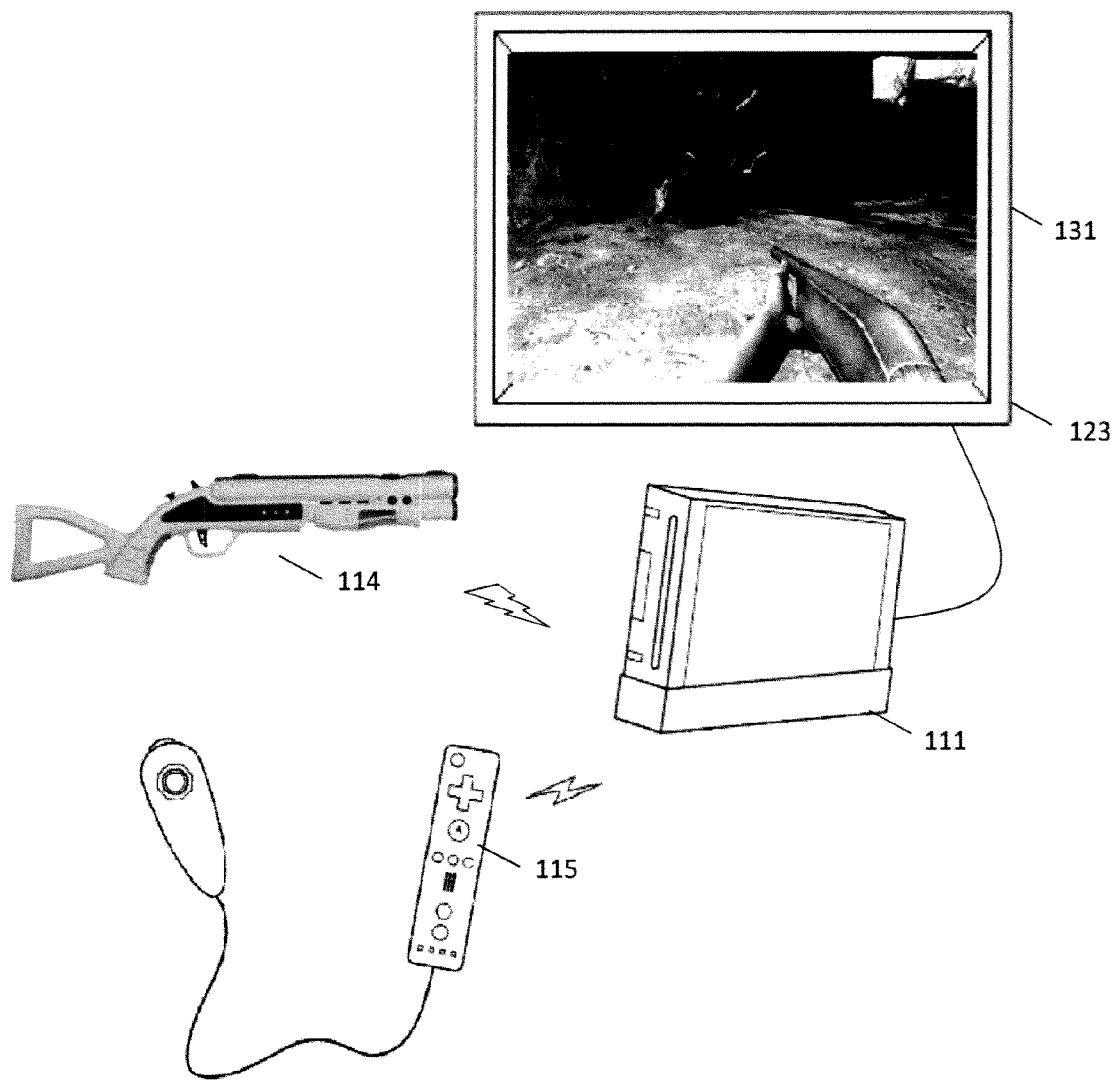
FIG. 2 illustrates an example of a video game system in accordance with aspects of the present invention.

FIG. 2 illustrates an example of a video game system in accordance with aspects of the invention. The video game system includes a video game console 111 with a processor for executing program instructions providing for game play and associated circuitry, a display device 123, and one or more input devices 114 and 115. The processor, responsive to inputs from the input devices 114 and 115, generally commands display on the display device 123 of game characters in and interacting with a virtual world of game play and possibly each other.

The instructions providing for game play are generally stored on removable media, for example, an optical disk. Accordingly, the game console may include an optical drive, for example, a DVD-ROM, CD-ROM, Blu-ray drive, or similar device, for reading the instructions for game play. In some embodiments, the removable media may be a flash memory data storage device. In other embodiments, the instructions providing for game play may be stored in a remote server that is accessed over one or more networks. In yet other embodiments, the instructions providing for game play may be stored on the local memory of the video game console.

The display device 123 is generally coupled to the video game console 111 by a cable, although in some embodiments a wireless connection may be used. In many embodiments, the display device 123 is a liquid crystal display. In some embodiments, the display device 123 is a television. In other embodiments, the display device 123 is integrated with the video game console 111. A display screen 131 of the display device 123 displays video images of game play, generally as commanded by the processor or other associated circuitry of the video game console 111. In the embodiment of FIG. 2, the display screen 131 shows a screen shot of video game play. As illustrated, the screen shot shows a display of a virtual hunting rifle, generally controlled by and animated in accordance with user inputs, for example as provided by input device 114 simulating a hunting rifle, and a virtual hunting target.

Input devices 114 and 115 are in various embodiments input devices for providing input to video game systems, for example, joysticks, gamepads, keyboards, mice, trackballs, touch screens, or other input devices. As discussed in more detail below, input devices 114 and 115 may also include one or more motion sensing devices and/or one or more physiological sensing devices. The input devices 114 and 115 are generally coupled to the video game console 111 by a cable, although in many embodiments a wireless connection may be used. When coupled to the video game console 111, the input devices 114 and 115 can send input data from the user, including data determined by the one or more motion sensing devices and/or one or more physiological sensing devices, to the video game console 111. The video game console utilizes the data, in some embodiments including the data determined by the physiological sensing devices, to determine game play states or game adjunct presentations. In some embodiments, the video game console 111 also sends feedback data to the input devices 114 and 115, as discussed in more detail below.

Figure 3:
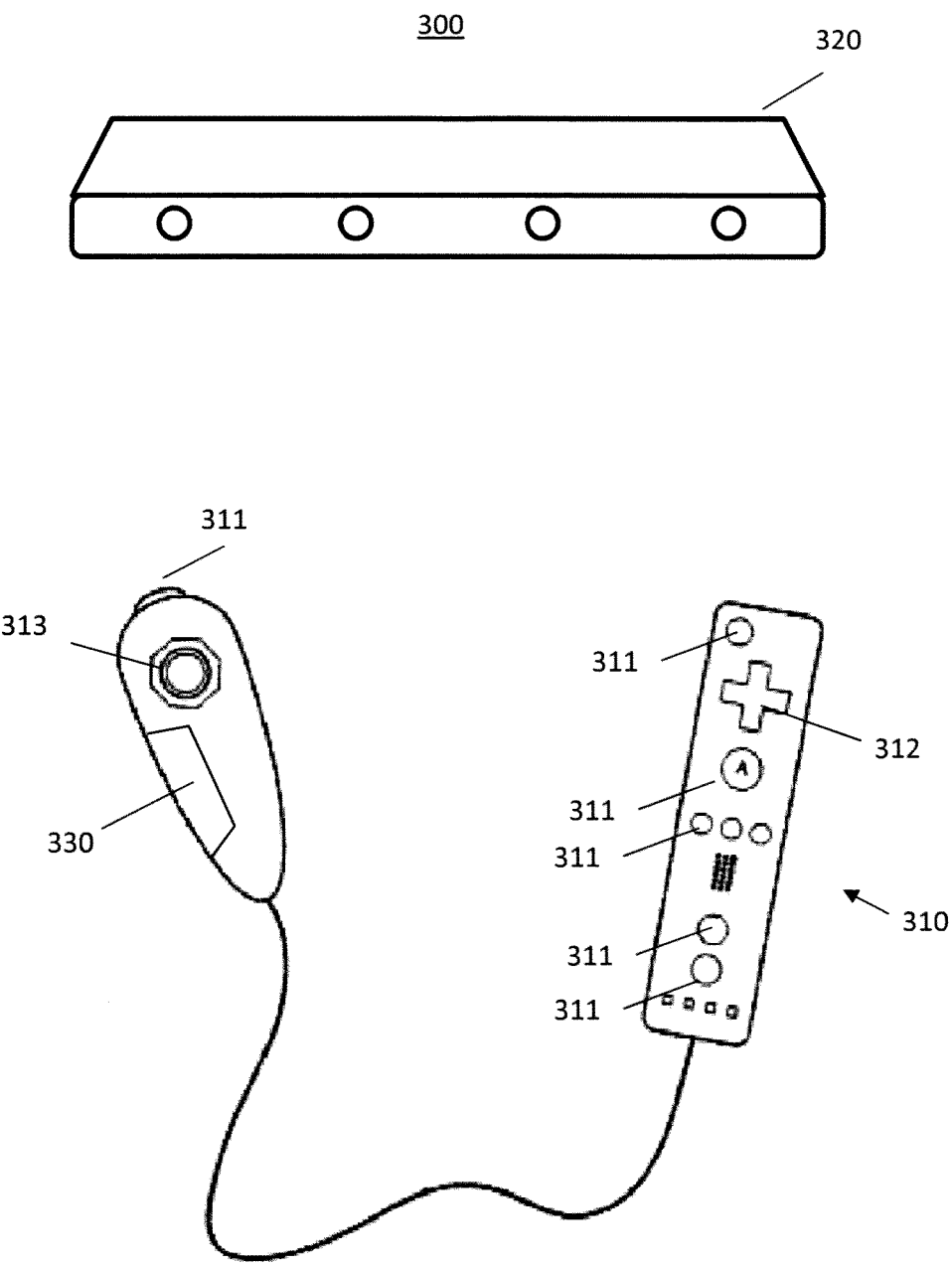
FIG. 3 illustrates an example of an input device in accordance with aspects of the present invention.

FIG. 3 illustrates an example of an input device in accordance with aspects of the present invention. In many embodiments, input device comprises a gamepad 310 having one or more input buttons 311, direction pads 312, and joysticks 313, which permit the user to interact with a video game system. In some embodiments, input device further comprises one or more motion sensing devices, which determine the motion and/or position of the input device and/or the user, and allow the user to interact with the video game system using physical movements. Motion sensing devices may include, for example, one or more gyroscopes, accelerometers, altimeters, magnetometers, infrared projectors and transceivers, depth-sensing cameras, global positioning systems, or any other similar device. Examples of systems incorporating exemplary motion and/or position sensing devices include the Nintendo Wii and Wii U, Sony PlayStation Move, and Microsoft Kinect platforms. In the embodiment illustrated in FIG. 3, gamepad 310 of input device may include, for example, one or more gyroscopes, accelerometers, and magnetometers (not shown). Input device of FIG. 3 also includes a depth-sensing camera 320. Depth-sensing camera 320 may be used, for example, to detect motion and/or position information relating to gamepad 310 and/or one or more users.

In some embodiments, input device further includes one or more physiological sensing devices for detecting one or more physiological states of a user. Physiological sensing devices may include, for example, photoplethysmographs (PPGs) for detecting heart rate and blood pressure, electromyographs (EMGs) for detecting muscle action potentials, thermometers for measuring skin temperatures, electrodermographs (EDGs) for measuring skin electrical activity and changes in anxiety or emotional stress, electroencephalographs (EEGs) for measuring brain activity, electrocardiographs (EKGs) for detecting heart rate, heart rate monitors, or any other device for determining a physiological measurement. Accordingly, physiological states of a user detected by the physiological sensing devices may indicate, for example, one or more of the following: heart rate, respiratory sinus arrhythmia, skin electrical activity, muscle action potential, blood pressure, skin temperature, respiratory rate, brain activity, or any other measurable physiological indicator. In FIG. 3, gamepad 310 includes a physiological sensing device 330, which in one embodiment is a photoplethysmograph for detecting heart rate and blood pressure.

In some embodiments, the input device further includes feedback devices for outputting information received from the video game console to the user. In some embodiments, feedback devices may take the form of a display that provides visual feedback to the user. The display of the input device may comprise a liquid crystal display (LCD), electrophoretic ink display (E Ink), light-emitting diode display (LED), or other known display mechanisms. In other embodiments, feedback devices may include an audio output such as a speaker. In other embodiments, feedback devices may also includes haptic devices for providing tactile feedback to the user such as, for example, forces, vibrations, or other similar haptic feedback.

Figure 4A:
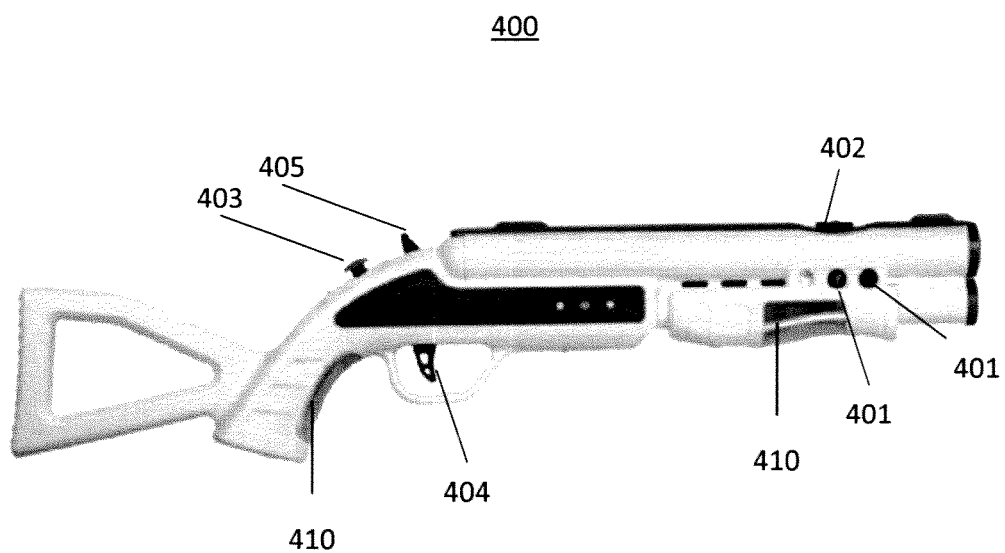
FIG. 4A illustrates an example of an input device in accordance with aspects of the present invention.
Figure 4B:
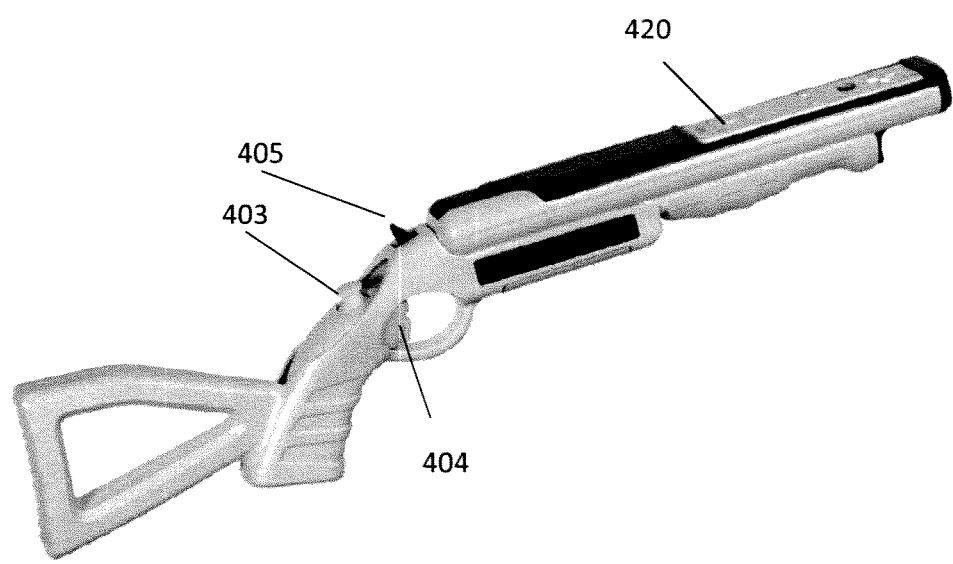
FIG. 4B illustrates an example of an input device in accordance with aspects of the present invention.

In accordance with aspects of the invention, for example to further enhance the realism and immersive qualities of game play, input devices may be physically formed to represent objects being used in an activity carried out in the video game (i.e., an in-game object). For example, as illustrated in FIGS. 4A and 4B, for a hunting simulation video game, the input device may be physically formed in a shape of a hunting rifle or other type of gun. In FIGS. 4A and 4B, although shaped generally as a rifle, the input device 400 still may include one or more traditional input buttons 401, direction pads 402, and joysticks 403, which permit the user to interact with a video game system. In some embodiments, the rifle-shaped input controller may also include a trigger 404 and hammer 405, which further increase the realism of the video game. In accordance with other aspects of this invention, and as shown in FIG. 4A, the rifle-shaped input device also includes one or more physiological sensing devices 410 for detecting one or more physiological states of a user. In accordance with yet other aspects of this invention, the rifle-shaped input device also includes one or more motion sensing devices. As discussed above, the one or more motion sensing devices may be integral to the rifle-shaped input device (e.g., built-in accelerometers, gyroscopes, magnetometers, infrared transceivers) or detached from the rifle-shaped input device (e.g., depth-sensing cameras, infrared projectors).

It is understood that although a rifle-shaped input device is shown, the input device may, in various embodiments, be formed to represent any number of in-game objects, including, for example, weapons, steering wheels, or pieces of sporting equipment. It is further understood that when the input device is formed to represent an in-game object, the user may operate the input device in a manner that mimics the actual operation of the object as used in the video game. For example, with respect to a tennis simulation video game, an input controller may be formed as a tennis racquet and the user may swing the tennis racquet-shaped input controller to command a virtual tennis player to swing its racquet.

In some embodiments, and as shown in FIG. 4B, an input device formed as an in-game object may include a docking mechanism to pair with a traditional input device like gamepad 420. In this manner, the input device formed as an in-game object may share or utilize components of the traditional input device, thereby reducing manufacturing costs and complexity. For example, the rile-shaped input device of FIG. 4B may utilize the gamepad, buttons, and motion sensing devices of gamepad 420.

The above described input device offers significant advantages over current input devices. For example, an input device according to the present invention that is formed as a hunting rifle offers the user of a hunting simulation a more realistic and immersive game play experience than a gamepad. In addition, the motion sensing devices allow the user to aim the hunting rifle-shaped input device as if he or she were actually aiming a hunting rifle, as opposed to merely using a joystick or direction pad to aim. Moreover, the feedback devices described above further enhance the realism of the game play. For example, when firing a shot, the rifle-shaped input device can vibrate to simulate a rifle's kick. As another example, the audio output device may output the sound of a rifle firing directly from the rifle-shaped input device itself, which may be more realistic than hearing the sound from a distant speaker associated with a television or video game console.

In accordance with aspects of this invention, the user's physiological state may be used to dynamically control or adjust game play by, for example, altering or manipulating one or more game play characteristics, including, for example, the game's difficulty level, available game play modes, background music, overall volume level, visual effects, story line, activities or behaviors of game controlled game characters, or other aspects of game play.

Figure 5:
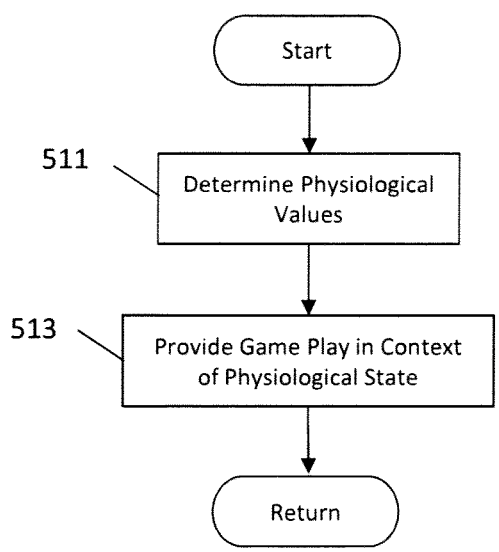
FIG. 5 is a flowchart of a process for providing a game play experience using a user's physiological state in accordance with aspects of the invention.

FIG. 5 is a flowchart of a process of a process for providing a game play experience making use of a user physiological state in accordance with aspects of the invention. The process may be implemented by a video game console, input devices, or a combination of devices. Additionally, the process may be implemented using a processor configured by program instructions.

In block 511 the process determines physiological values for a user playing a video game. In some embodiments the process determines the physiological values based on information sourced from a physiological sensor, which in some embodiments is part of or coupled to a game controller. The physiological values are generally reflective of one or more aspects of a physiological state of the user.

In block 513 the process provides for game play in context of the user's physiological state, as indicated by the physiological values. Game play in context of the user's physiological state may be provided by adjusting game play actions to reflect or by taking into account the user's physiological state, or adjusting presentations associated with game play, but which are not necessarily present in a virtual world provided by game play.

In some embodiments game play actions may be adjusted to reflect the user's physiological state by adjusting actions made or attempted to be made by a game character controlled by the user based on the user's physiological state. In some embodiments, for example, actions by the game character controlled by the user may be limited in ways an action of an individual may be limited if the individual is overexcited, overly nervous, or overly physically taxed. In some embodiments game play actions by characters controlled by other than the user, for example game characters controlled by artificial intelligence program instructions of the game, are adjusted to be responsive to the user's physiological state. For example, a game-controlled opponent may become more aggressive, for example taking greater risks in making an attack or attacking more ferociously if the user's physiological state indicates fear or exhaustion.

In some embodiments presentations to a user of material that is not explicitly part of game play are adjusted or selected based on the user's physiological state. For example, video games may include audio presentations in the form of background music, with the background music not part of the virtual world provided in game play, and the music played may be selected based, at least in part, on the user's physiological state. As a more particular example, background music may be played while a user controls a character moving across a wilderness in a hunting game, and the background music selected may have a quicker tempo, or be played at a higher volume, if the user's physiological state indicates nervousness. In most embodiments the background music is not generated by equipment in the virtual world of game play, and would not be expected to be heard, if possible, by the character controlled by the user.

In some embodiments the user's physiological state is determined by comparing the physiological values to reference values. In some embodiments the reference values may be determined by monitoring user physiological values over a period of time to determine the reference values. The reference values may be determined, in various embodiments, by determining an average physiological value over the period of time, a mean physiological value over the period of time, or by way of some other analysis. In some embodiments the period of time is prior to commencement of game play, in some embodiments the period of time is during game play, and in some embodiments the periods of time are repeated at various intervals during game play.

In some embodiments the reference values are predefined physiological value levels. For example, in some embodiments a particular value for a heart rate, or a particular combination of values for heart rate, breathing rate, and blood pressure may define a level below which the user may be considered not nervous and above which the user may be considered nervous. Similarly, different particular increasing values for a heart rate may define increasing levels of exertion of the user.

Figure 6:
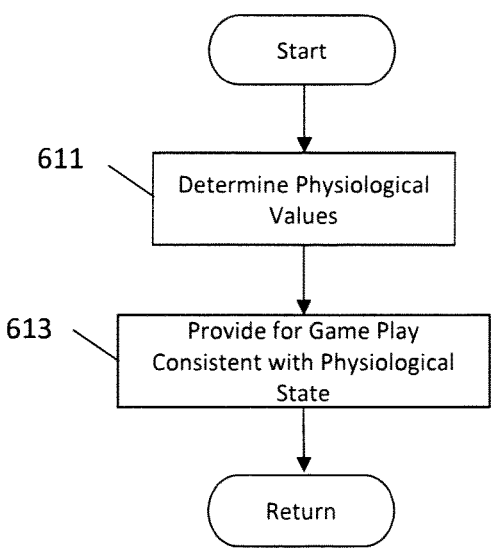
FIG. 6 is a flowchart of a process for providing game play consistent with a user's physiological state in accordance with aspects of the invention.

FIG. 6 is a flowchart of a process for providing game play consistent with a user's physiological state. The process may be implemented by a video game console, input devices, or a combination of devices. Additionally, the process may be implemented using a processor configured by program instructions.

In block 611 the process determines physiological values for a user playing a video game. In some embodiments the process determines the physiological values based on information sourced from a physiological sensor, which in some embodiments is part of or coupled to a game controller. The physiological values are generally reflective of one or more aspects of a physiological state of the user.

In block 613 the process provides for game play consistent with the physiological state of the user.

In some embodiments providing for game play consistent with the physiological state of the user comprises providing for game play, but disallowing entry into game play modes in which a character controlled by the user, for example through operation of a game controller, exhibits or utilizes skills or performs actions generally not available to or which generally cannot be successfully performed by an individual in the physiological state of the user. For example, an overly excited, nervous, or physically taxed individual may generally be unable to perform fine manipulations of or provide careful adjustment to objects. Therefore a mode such as a shooting game sniper mode, in which a user may be presented a view through a telescopic sight and allowed to make fine adjustments of gun position reflected in the view, may not be made available to a user exhibiting a breathing rate above a reference value breathing rate.

In some embodiments providing for game play consistent with the physiological state of the user comprises providing for game play in which game controlled entities behave in a manner consistent with an expected behavior of such entities to an individual exhibiting the physiological state of the user. For example, in some embodiments the game controlled entities may be wild animals, with wild animals expected to be more likely to attack an individual exhibiting fear, and the process may provide for more frequent animal attacks if the physiological state of the user indicates fear, for example as indicated by a heart rate very high above a reference heart rate value and a breathing rate only high above a reference breathing rate value.

In some embodiments providing for game play consistent with the physiological state of the user comprises providing for game play in which effects of game controller inputs are modified to reflect the physiological state of the user. In some embodiments movements of a game character responsive to the game controller inputs may be amplified if the physiological value for the user indicates nervousness, or attenuated if the physiological value for the user indicates physical over-taxation. For example, movements of a virtual gun during game play, responsive to movement of a gun controller by the user, may be made to overshoot an intended position or to oscillate about a position if the user physiological value indicates nervousness. Similarly for example, movements of the game character, controlled by the user by way of the game controller, may be made slower if the user physiological value indicates physical over-taxation.

In some embodiments providing for game play consistent with the physiological state of the user comprises providing for game play with effects of user controlled game character actions are varied based on a transient physiological state of the user. In some embodiments effects of user controlled game character actions are varied based upon whether a physiological state of the user indicates particular physiological activity of the user at the time of the action. For example, in a shooting game effects of a game character taking a shot may vary depending on whether the user was in the act of breathing at the time of taking the shot, or position in a cardiac cycle of the user at the time of taking the shot, for example in a sniper mode of the shooting game.

Figure 7:
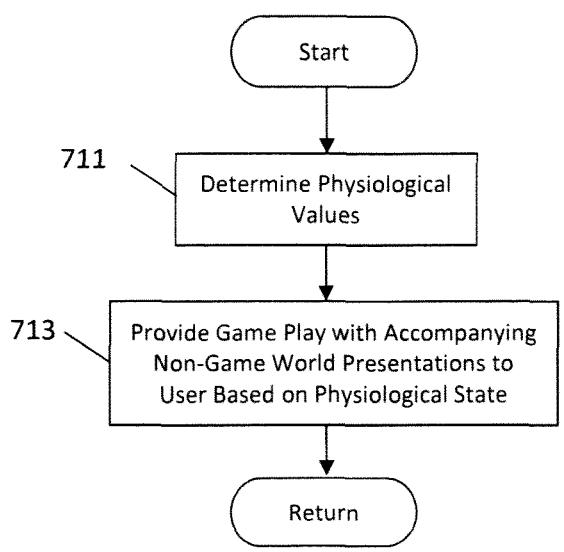
FIG. 7 is a flowchart of a process for providing game play with accompanying presentations based on a user's physiological state in accordance with aspects of the invention.

FIG. 7 is a flowchart of a process for providing game play with accompanying presentations based on a user's physiological state in accordance with aspects of the invention. In various embodiments, the process may be implemented by a video game console, input devices, or a combination of devices. Additionally, the process may be implemented using a processor configured by program instructions.

In block 711 the process determines physiological values for a user playing a video game. In some embodiments the process determines the physiological values based on information sourced from a physiological sensor, which in some embodiments is part of or coupled to a game controller. The physiological values are generally reflective of one or more aspects of a physiological state of the user.

In block 713 the process provides for game play with accompanying non-game world presentations based on the physiological state of the user. In various embodiments a non-game world presentation is a presentation presented to a user playing a game, but which is not part of or sourced by equipment in the virtual world of game play, or which would not be expected to be, in various embodiments, audible or visible to a game character in the virtual world. In some embodiments providing accompanying non-game world presentations based on the physiological state of the user comprises selecting a non-game world presentation based on the physiological state of the user. In some embodiments providing accompanying non-game world presentations comprises adjusting an aspect of the non-game world presentation. In some embodiments the aspect is a volume of the non-game world presentation. In some embodiments the non-game world presentation is background music to game play.

Figure 8:
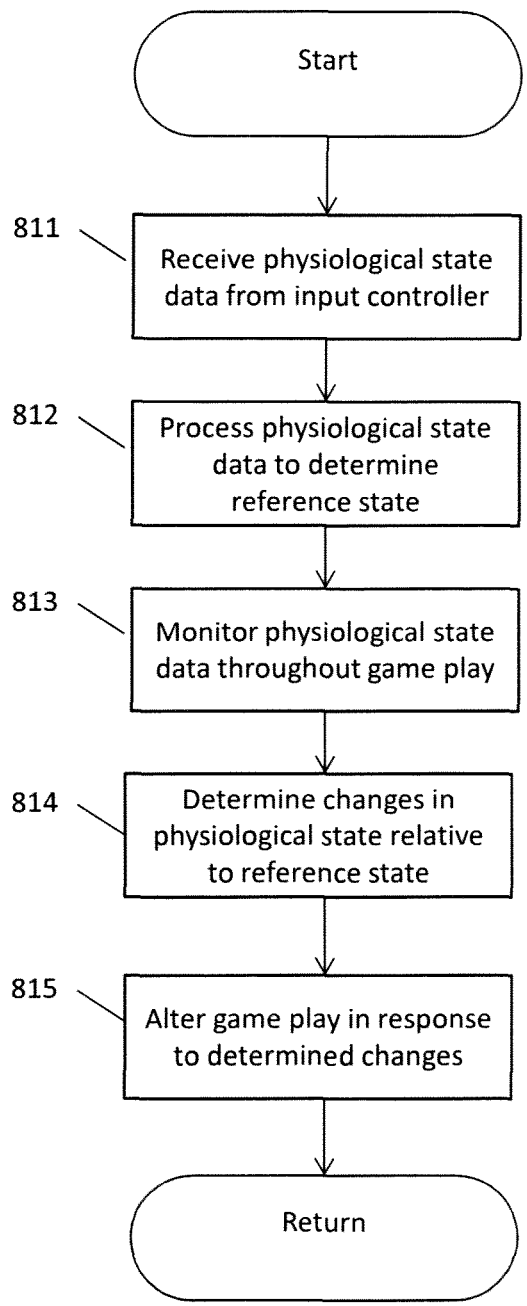
FIG. 8 is a flowchart of a process for using the user's physiological state to dynamically control game play in accordance with aspects of the invention.
Figure 9:
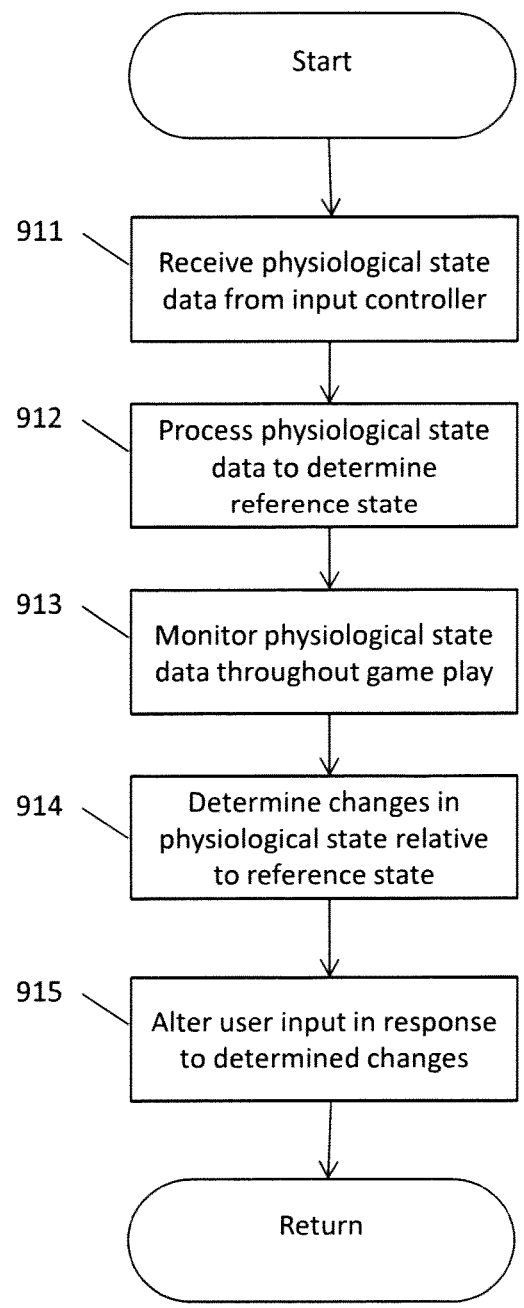
FIG. 9 is a flowchart of a process for using the user's physiological state to alter the data received from the user's input device in accordance with aspects of the invention.

FIG. 8 is a flowchart of a process for using the user's physiological state to dynamically control game play in accordance with aspects of the invention. The process may be implemented by a video game console, input devices, or a combination of devices. Additionally, the process may be implemented using a processor configured by program instructions.

In block 811, the video game console's processor receives the user's physiological state data from the input controller. As described above, the user's physiological state may include any number of physiological indicators, including heart rate, respiratory sinus arrhythmia, skin electrical activity, muscle action potential, blood pressure, skin temperature, respiratory rate, brain activity, or any other measurable physiological indicator. The physiological state may be continuously transmitted by the input controller to the processor before and during game play and thus collected over one or more periods of time. In block 812, the processor then processes the physiological state data to determine a reference state of the user (e.g., resting heart beat, resting breathing rate, resting skin temperature, etc.). After determining the reference state of the user, the processor monitors the user's physiological state throughout game play in block 813. In block 814, the processor determines the relative changes in the user's physiological state relative to the reference state. In block 815, the processor alters one or more game play characteristics in response to one or more determined changes.

To further illustrate how the user's physiological state may alter game play, several non-limiting examples are presented below. In the embodiment of a hunting simulation video game, physiological states indicative of a user's excitement level (e.g. heart rate, respiratory sinus arrhythmia, skin electrical activity, muscle action potential, blood pressure, skin temperature, respiratory rate, brain activity, etc.) may be used to change actions or activities of game controlled characters, such as animals in the game. For example animals in the game may be more aggressive, resulting in for example increased frequency of animal attacks. For example, if the user's physiological state remains steady and within a predetermined threshold indicating relative calmness, then the frequency of animal attacks is reduced. On the other hand, if the user's physiological state increases and exceeds a predetermined threshold indicating relative excitement, then the frequency of animal attacks is increased. Alternatively, the user's physiological state may be used to maintain a low level of difficulty. For example, if the user's physiological state increases, animals in the game play may become less aggressive, resulting in for example decreased animal attacks. This mode of altering game play would be advantageous in, for example, a beginner mode or tutorial mode where the goal is to maintain a relatively low level of difficulty for the user.

As another example, the user's physiological state may be used to control whether certain game play modes are available to a user. In the hunting simulation video game embodiment, for example, there may be a game play mode called "sniper mode," in which the user is presented a zoomed-in view of his target. The user's physiological state may be used to determine the availability of the "sniper mode" game play mode. If the user's physiological state remains steady and within a predetermined threshold indicating relative calmness, then the "sniper mode" may be made available. On the other hand, if the user's physiological state increases and exceeds a predetermined threshold indicating relative excitement, then the "sniper mode" may be disabled.

As yet another example, the user's ability to control his or her physiological state may be used to achieve certain game play bonuses. For instance, a user's respiratory sinus arrhythmia provides an approximation of the user's breathing pattern. Game play modes may require the user to synchronize his or her breathing to a reference rhythm provided by the game in order to achieve certain game play bonuses, such as additional health or points.

In some embodiments, the user's physiological state may additionally comprise the motion and/or position data of the input device and/or user. For example, if the motion and/or position data of the input device and/or user indicates that the user's jittering or shaking exceeds a certain predetermined threshold, then the user may be determined to be in a heightened state of tension. On the other hand, if the motion and/or position data of the input device and/or user indicates that the user is particularly steady, then the user may be determined to be in a relative state of calmness. These determinations can then be used to affect game play as described above.

One of ordinary skill in the art would understand that the user's physiological state may be determined by one physiological indicator or a combination of physiological indicators. For example, a user's physiological state may be determined by measuring both the steadiness of a user's hand and the user's heart rate, as measured, for example, by the user's respiratory sinus arrhythmia.

These examples of using the user's physiological state to alter or manipulate game play characteristics are merely illustrative, and one of ordinary skill would understand that the user's physiological state may be used to alter or manipulate any number of game play characteristics in accordance with the present invention.

In accordance with other aspects of this invention, the user's physiological state may also be used to alter or manipulate data received from the user's input device. FIG. 6 is a flowchart of a process for using the user's physiological state to dynamically control game in accordance with aspects of the invention. The process may be implemented by a video game console, input devices, or a combination of devices. Additionally, the process may be implemented using a processor configured by program instructions.

In block 911, the video game console's processor receives the user's physiological state data from the input controller. As described above, the user's physiological state may include any number of physiological indicators, including heart rate, respiratory sinus arrhythmia, skin electrical activity, muscle action potential, blood pressure, skin temperature, respiratory rate, brain activity, or any other measurable physiological indicator. The physiological state may be continuously transmitted by the input controller to the processor before and during game play and thus collected over one or more periods of time. In block 912, the processor then processes the physiological state data to determine a reference state of the user (e.g., resting heart beat, resting breathing rate, resting skin temperature, etc.). After determining the reference state of the user, the processor monitors the user's physiological state throughout game play in block 913. In block 914, the processor determines the relative changes in the user's physiological state relative to the reference state. In block 915, the processor alters one or more user inputs in response to one or more determined changes in the user's physiological state.

The following non-limiting examples further illustrate how using the user's physiological state to alter the data received from the input device may be incorporated in a video game. In a hunting video game simulation, if the processor determines that the user's physiological state exceeds certain predetermined thresholds indicating a particular state of excitement, then input data representing the rifle-shaped input device's movement may be amplified by a predetermined factor such that the movement of the rifle-shaped input device becomes exaggerated, making it more difficult for the user to aim precisely. In this way, the physiological state may alter the difficulty of controlling the video game.

As another example, in a racing simulation video game, an input device formed as a steering wheel may be used. If the processor determines that the user's physiological state exceeds certain predetermined thresholds indicating a particular state of excitement, then input data representing the steering wheel input device's movement may be amplified by a predetermined factor such that the movement of the steering wheel input device becomes exaggerated, making it more difficult for the user to steer the vehicle. In this way, the physiological state may alter the difficulty of controlling the video game.

These examples of using the user's physiological state alter or manipulate data received from the user's input device are merely illustrative, and one of ordinary skill would understand that the user's physiological state may be used to alter or manipulate any number of game play characteristics in accordance with the present invention.

Figure 10:
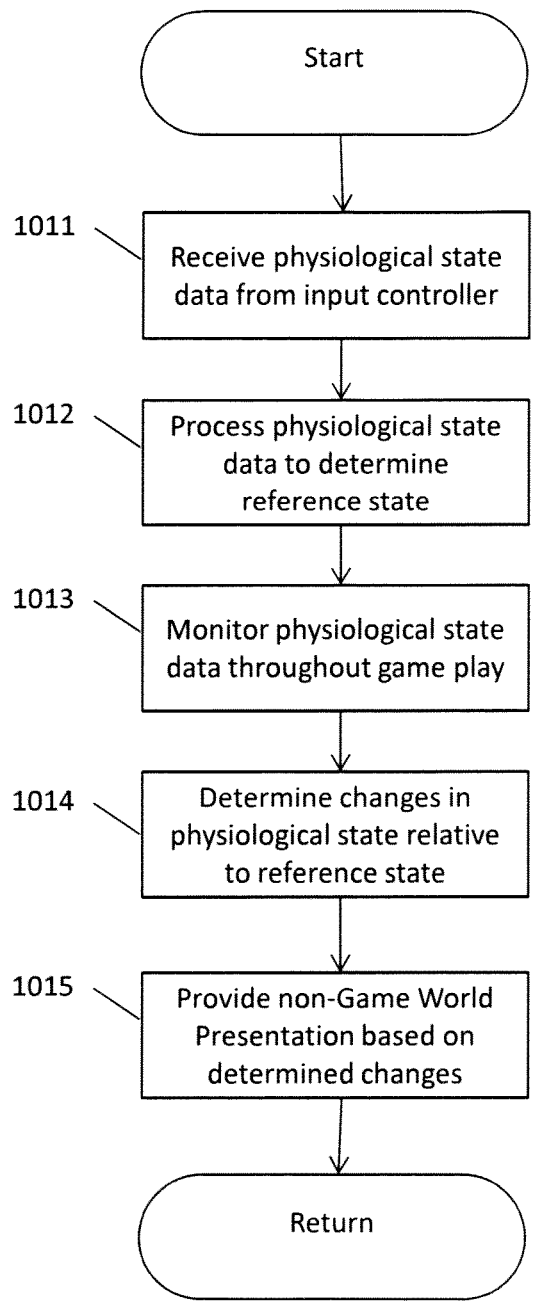
FIG. 10 is a flowchart of a process for using the user's physiological state to determine game adjunct presentations in accordance with aspects of the invention.

FIG. 10 is a flowchart of a process for using the user's physiological state to dynamically control presentations adjunct to a game in accordance with aspects of the invention. The process may be implemented by a video game console, input devices, or a combination of devices. Additionally, the process may be implemented using a processor configured by program instructions.

In block 1011, the video game console's processor receives the user's physiological state data from the input controller. As described above, the user's physiological state may include any number of physiological indicators, including heart rate, respiratory sinus arrhythmia, skin electrical activity, muscle action potential, blood pressure, skin temperature, respiratory rate, brain activity, or any other measurable physiological indicator. The physiological state may be continuously transmitted by the input controller to the processor before and during game play and thus collected over one or more periods of time. In block 1012, the processor then processes the physiological state data to determine a reference state of the user (e.g., resting heart beat, resting breathing rate, resting skin temperature, etc.).

After determining the reference state of the user, the processor monitors the user's physiological state throughout game play in block 1013. In block 1014, the processor determines the relative changes in the user's physiological state relative to the reference state. In block 1015, the processor selects or alters one or more presentations adjunct to a game in response to one or more determined changes.

As an example, the user's physiological state may be used to interactively control the score of the background music. If the user's physiological state is indicative of a heightened stress level, then the score of the background music may dynamically change to up tempo and exciting music. On the other hand, if the user's physiological state is indicative of a normal or lowered stress level, then the score of the background music may dynamically change to slow and serene music.

Although the invention has been discussed with respect to various embodiments, it should be recognized that the invention comprises the novel and non-obvious claims supported by this disclosure.

What is claimed is:

1. A video game system, comprising:
    an input device comprising at least one physiological sensing device, the physiological sensing device configured to generate information of a physiological state of a user; and
    a video game console with a processor, said processor being configured to:
    receive data from the input device indicating the physiological state of a user;
    process said physiological state data; and
    provide game play for a shooting game, based on inputs from the input device, consistent with said physiological state data, including disallowing entry into a particular mode of game play of the shooting game if the physiological state of the user exceeds a predetermined threshold, wherein disallowing entry into the particular mode of game play of the shooting game is based on a character controlled by the user performing actions which generally cannot be performed by an individual in the physiological state of the user and allowing entry into the particular mode of game play of the shooting game if the physiological state of the user remains within the predetermined threshold;
    wherein the particular mode of game play of the shooting game is a sniper mode of game play.

2. The video game system of claim 1, wherein the input device further comprises:
    at least one motion sensing device, the at least one motion sensing device generating information of at least some of the inputs from the input device; and
    at least one feedback device.

3. The video game system of claim 1, wherein the input device is physically formed to represent an in-game object.

4. The video game system of claim 3, wherein the in-game object is a rifle.

5. The video game system of claim 1, wherein said processor being configured to provide game play in context of said physiological state data comprises said processor being configured to modify effects of inputs from the input device based on said physiological state data.

6. The video game system of claim 1, wherein the physiological state data comprises at least one of the user's heart rate, respiratory sinus arrhythmia, skin electrical activity, muscle action potential, blood pressure, skin temperature, and respiratory rate.

7. The video game system of claim 1, wherein said processor being configured to provide game play consistent with said physiological state data comprises said processor being configured to cause game controlled entities to attack more ferociously if said physiological state data indicates exhaustion of the user.

8. The video game system of claim 7, wherein the game controlled entities comprise wild animal characters, and said processor is configured to increase in a frequency of attacks by the wild animal characters if said physiological state data indicates fear or exhaustion of the user.

9. The video game system of claim 1, said processor being configured to provide game play consistent with said physiological state data comprises said processor being configured to oscillate movements of a virtual gun controlled by a user using the input device if said physiological state data indicates nervousness of the user.

10. The video game system of claim 1, wherein said processor being configured to provide game play consistent with said physiological state data comprises said processor being configured to provide a game adjunct presentation based on said physiological state data.

11. The video game system of claim 10, wherein the game adjunct presentation comprises background music to game play.

12. A video game system, comprising:
    an input device comprising at least one physiological sensing device, the physiological sensing device configured to generate information of a physiological state of a user; and
    a video game console with a processor, said processor being configured to:
    receive physiological state data for a user of a video game including a user controlled game character;
    compare the physiological state data to at least one reference value; and
    provide for video game play in context of a result of the comparison including providing effects of user commands for the user controlled game character indicated by inputs from the user input device based on the physiological state data being within the at least one reference value and modifying the effects of user commands for the user controlled game character indicated by inputs from the user input device based on the physiological state data exceeding the at least one reference value, the modified effects including oscillation of position of a virtual gun during game play.

13. The video game system of claim 12, wherein the at least one reference value is a predefined value.

14. The video game system of claim 12, wherein said processor is configured to determine the at least one reference value based on physiological state data for the user received over a period of time.

15. The video game system of claim 14, wherein the period of time is at the beginning of video game play.

16. The video game system of claim 14, wherein the period of time is prior to video game play.

17. The video game system of claim 14, wherein the period of time is during video game play.

18. The video game system of claim 14, wherein said processor being configured to provide for video game play in context of the result of the comparison further comprises said processor being configured to respond to a request to enter a game mode based on the result of the comparison.

19. The video game system of claim 14, wherein said processor being configured to provide for video game play in context of the result of the comparison further comprises said processor being configured to select background music to video game play based on the result of the comparison.

20. The video game system of claim 14, wherein said processor being configured to provide for video game play in context of the result of the comparison further comprises said processor being configured to alter a frequency of attacks by game controlled characters based on the result of the comparison.

21. The video game system of claim 12, wherein the physiological state data for the user comprises heart rate data and blood pressure.

22. The video game system of claim 12, wherein the physiological state data for the user comprises at least one of the user's heart rate, respiratory sinus arrhythmia, skin electrical activity, muscle action potential, blood pressure, skin temperature, and respiratory rate.

23. A video game system, comprising:
   an input device comprising at least one physiological sensing device, the physiological sensing device configured to generate information of a physiological state of a user; and
   a video game console with a processor, said processor being configured to:
   receive physiological state data for a user of a video shooting game, the physiological data including at least heart beat data;
   compare the heart beat data to at least one reference value to determine a position in a cardiac cycle of the user at a time of taking a shot in the video shooting game; and
   provide for video game play in context of a result of the comparison, including varying effects of the shot in the video shooting game based on the position in the cardiac cycle of the user at the time of taking of the shot.

24. The video game system of claim 23, wherein the at least one reference value is a predefined value.

25. The video game system of claim 23, wherein said processor is configured to determine the at least one reference value based on physiological state data for the user received over a period of time.

26. The video game system of claim 23, wherein said processor being configured to provide for video game play in context of the result of the comparison further comprises said processor being configured to respond to a request to enter a game mode based on the result of the comparison.

27. The video game system of claim 23, wherein said processor being configured to provide for video game play in context of the result of the comparison further comprises said processor being configured to select background music to video game play based on the result of the comparison.

28. The video game system of claim 23, wherein said processor being configured to provide for video game play in context of the result of the comparison further comprises said processor being configured to alter a frequency of attacks by game controlled characters based on the result of the comparison.

* * * * *